United States Patent
Li et al.

(10) Patent No.: US 9,380,491 B2
(45) Date of Patent: Jun. 28, 2016

(54) MECHANISM FOR INTERFERENCE MITIGATION IN SHORT-RANGE COMMUNICATION PICO NETWORKS

(75) Inventors: Zhenhong Li, Shanghai (CN); Haifeng Wang, Shanghai (CN); Ying Hu, Shanghai (CN); Jian Zhang, Shanghai (CN); Honglin Hu, Shanghai (CN)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 14/074,978

(22) PCT Filed: May 10, 2011

(86) PCT No.: PCT/CN2011/073868
§ 371 (c)(1),
(2), (4) Date: Nov. 8, 2013

(87) PCT Pub. No.: WO2012/151741
PCT Pub. Date: Nov. 15, 2012

(65) Prior Publication Data
US 2014/0187237 A1 Jul. 3, 2014

(51) Int. Cl.
*H04W 72/00* (2009.01)
*H04W 28/04* (2009.01)
*H04W 74/08* (2009.01)
*H04W 16/14* (2009.01)
*H04W 84/18* (2009.01)

(52) U.S. Cl.
CPC ............ *H04W 28/042* (2013.01); *H04W 16/14* (2013.01); *H04W 28/048* (2013.01); *H04W 74/0858* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 2002/0075941 A1* | 6/2002 | Souissi | H04B 1/715 375/133 |
| 2006/0089149 A1* | 4/2006 | Kizu | H04W 16/10 455/450 |
| 2006/0281408 A1* | 12/2006 | Grushkevich | H04W 72/082 455/41.2 |
| 2008/0139212 A1 | 6/2008 | Chen et al. | |
| 2011/0237188 A1* | 9/2011 | Sen | H04B 15/00 455/41.2 |
| 2011/0294432 A1* | 12/2011 | Desai | H04B 1/715 455/41.2 |

FOREIGN PATENT DOCUMENTS

| | | |
|---|---|---|
| JP | 2009194455 | 8/2009 |
| WO | 2005048534 | 5/2005 |

* cited by examiner

*Primary Examiner* — Suhail Khan
(74) *Attorney, Agent, or Firm* — Oblon, McClelland, Maier & Neustadt, L.L.P

(57) ABSTRACT

There is provided an interference mitigation or frequency channel collision mitigation scheme usable for a short range communication network where a network element of a cellular network is used as a coordinator or controller for the collision mitigation. Communication information regarding a communication in the short range communication network and concerning a frequency selection for a communication are processed so as to determine collision mitigation data for reducing interference in the communication in the short range communication network. The collision mitigation data regarding the communication in the short range communication network are sent to a communication network element such as a UE acting as a master node of the short range communication network.

18 Claims, 14 Drawing Sheets

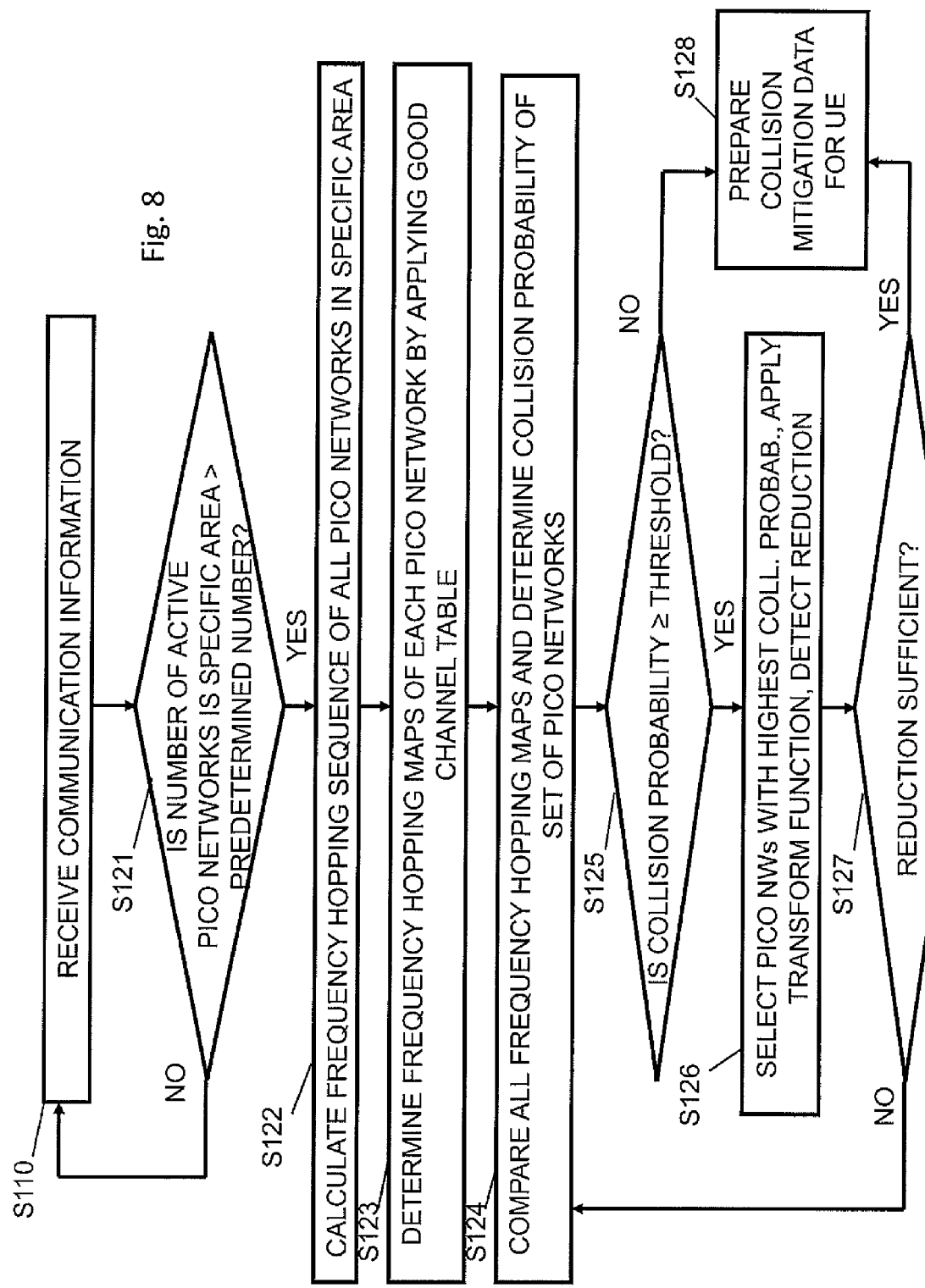

MECHANISM FOR INTERFERENCE MITIGATION IN SHORT-RANGE COMMUNICATION PICO NETWORKS

BACKGROUND OF THE INVENTION

Field of the Invention

The present invention relates to a mechanism usable for achieving an interference mitigation or frequency channel collision mitigation in a short range communication network covering a small area, also referred to as a pico network. In particular, the present invention is related to apparatuses, methods and computer program products providing a mechanism by means of which an interference degree in a pico network of a first communication network type, such as a Bluetooth network, can be reduced wherein a communication network element of a cellular network which is acting as a gateway node for the pico network is used.

The following meanings for the abbreviations used in this specification apply:
AFH: Adaptive Frequency Hopping
BS: Base Station
BD_ADDR: Bluetooth device address
BT: Bluetooth
BTLE: Bluetooth Low Energy
CLK: Clock
GW: Gateway
ISM: Industrial-Scientific-Medical
LTE: Long Term Evolution
LTE-A: LTE Advanced
SN: Slave Node of BT network
UE: User Equipment In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) communication networks like the Universal Mobile Telecommunications System (UMTS), enhanced communication networks based e.g. on LTE, cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN), Bluetooth or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

In the following, a convergence scenario for communication networks of different types is considered. For example, a scenario is considered where a first network based on a short-range communication technology such as Bluetooth or Bluetooth Low Energy and a second network being a cellular communication network such as a 3GPP based network like an LTE network are established in the same area, i.e. have overlapping coverage areas.

BTLE is an evolution in the Bluetooth wireless communication technology. BTLE offers very low peak, average and idle mode power consumption and has an improved range. Thus, it is applicable in various application fields, such as automotive, entertainment, home automation etc.

Usually, as commonly known by persons skilled in the art, a cellular network has a system architecture where a user equipment (UE) is under the control of a base station (BS). One or more BT or BTLE networks, which usually have a significantly shorter range, can exists in the coverage area of the cellular network. Due to the different size ranges of the networks, a cellular network can therefore be seen as a macro network (referred to herein below simply as network), while a BT or BTLE based network can be seen as a pico-network.

In the recent years, UEs are equipped with different types of interfaces so as to be able to communicate view different types of networks. For example, several commercial UEs have beside the cellular network interface also a Bluetooth interface to enable various applications. A UE equipped with a BT interface may be used also to play a more important role in the converged scenario, for example as a gateway node between the cellular network and the BT or BTLE pico network.

Specifically, according to one conceivable scenario, master nodes of BTLE pico networks are the UEs of the cellular networks, which may be referred to as gateway UEs or GW UEs. In other words, the GW UE are dual-mode UEs and have both BTLE and cellular interfaces. For example, in case the UE is in idle mode, the cellular interface of the UE can be activated by either the BS or by the UE's own BTLE interface.

However, in case there are several BT or BILE based pico networks in a specific area, i.e. several BT pica networks are adjacent to each other or even overlap each other, there may be caused an interfere between the individual pico networks or between the BT or BILE based pico network and another type of network working on the same frequency bans. As one example for such an interference, a frequency channel collision may occur.

Specifically, when operating in the unlicensed 2.4 GHz ISM band, a BTLE pico network may inevitably encounter an interference problem from other networks within the same location and frequency band, either intentionally or by chance. There are several approached proposed to deal with such interference problems, for example frequency hopping where the used frequency channel is changed with the available band randomly or on the basis of a preset plan. However, communication devices of the pico networks may still encounter a high packet interference either from other access technologies such as e.g. Wi-Fi, or from other BT pico networks in case several pico networks are simultaneously operating in the same area.

FIGS. 12a and 12b illustrate the interference problem described above. FIGS. 12a and 12b show a diagram illustrating a usage of different frequency channels (here channels 0 to 36 according to current Bluetooth specifications) of an available frequency band in different time slots (t0 to t7), wherein the legends in FIGS. 12a and 12b explain the assignment of the channels to different types of communication networks (a hatched field represents that the specific network communicates at the respective time in the respective channel). Specifically, in FIG. 12a, two BT pica networks 1 and 2 are present in the same area as a Wi-Fi network, while in FIG. 12b three BT pico networks are present in the same area.

As shown in FIG. 12a, the interference between BTLE packets and Wi-Fi transmissions which use direct sequence spread spectrum or orthogonal frequency-division multiplexing as its physical layer technology results in a channel collision in channel 1 at to, in channel 3 in t1, in channel 2 at t3, in channel 3 at t5, in channel 2 at t6, and in channel 1 at t7, for example. Thus, there are several interferences between the BT pica networks and the Wi-Fi network.

On the other hand, as shown in FIG. 12b, the interference between different BTLE pico networks is shown where a collision in a channel 4 at t2 and in channel 2 at t6 may happen, for example.

The reason for the interference illustrated in FIGS. 12a and 12b is that a frequency hopping sequence is generated on the basis of the Bluetooth device address (BD ADDR), wherein the time clock of each device is independent, so that different sequences may collide with a certain probability. As shown in the FIG. 12b, for example, pico network 3 uses the same the frequency as pica network 1 and pico network 2 at time t2 and t6, respectively. The packets transmitted at the collision time-frequency will interfere each other and may not be correctly decoded. Furthermore, the interference caused by collisions of packets from multiple BTLE pico networks may also degrade the throughput of the network significantly. For example, there may be a scenario where tens or hundreds of Bluetooth device are located and active in a specific area such as a shopping mall or the like, to specific times, such as shopping peak hours. Thus, there may be plural BTLE pico networks established for example in case the devices are used to "sense" information of the shopping mall with a corresponding application. These may increase the number of interferences to a great extent.

There are some technologies proposed to deal with such situations, i.e. to reduce the possible channel collisions, for example. As one example, a so-called adaptive frequency hopping (AFH) scheme may be employed which can avoid the interference between a pico network and a network of another access technology. Specifically, an AFH algorithm may be implemented to reduce interference between BTLE and other access technologies working at the ISM band. The basic philosophy of AFH is to detect the channels used by other systems and to avoid a usage of these channels at the frequency hopping step. FIG. 13 shows an example of the frequency hopping result with AFH in a scenario as explained in connection with FIG. 12a. The channels which are improper for a selection as being used for the pico networks, which are also referred to as "bad channels", i.e. those channels used by Wi-Fi, are identified and excluded from a channel table for frequency hopping. Thus, a collision between the Wi-Fi network and the BTLE pico networks can be avoided, as depicted in FIG. 13.

However, current AFH schemes are not usable to reduce the interference among different BTLE pico networks, i.e. in a scenario as shown in FIG. 12b.

Thus, as an interference reduction mechanism for a scenario as shown in FIG. 12b, i.e. where several BTLE pico networks exist, other approaches are discussed. For example, clustering of pico networks by the clock synchronization of master nodes from different pico networks, i.e. two pico networks start transmission of a Tx slot or an Rx slot at the same time, can be used to reduce an interference between different pico networks. The probability of interference between two asynchronous pico networks transmitting 1-slot packets is twice of that between two synchronous pico networks. However, when the number of pico networks within the same location or area increases, the performance of the networks may degrade sharply. For example, more than 20% collision of packets can be observed when there are 10 synchronized pico networks.

SUMMARY OF THE INVENTION

It is an object of the invention to provide an apparatus, method and computer program product by means of which an improved interference mitigation or frequency channel collision mitigation can be achieved in a short range communication network covering a small area, such as a BT or BTLE based pico network.

This object is achieved by the measures defined in the attached claims.

According to an example of an embodiment of the proposed solution, there is provided, for example, an apparatus comprising a first transceiver configured to communicate in a first network of a first communication technology type, a second transceiver configured to communicate in a second network of a second communication technology type, a transmitter portion configured to send communication information regarding a communication in the first network to a communication network control element of the second network, wherein the communication information concern a frequency selection in the first network, a receiver portion configured to receive collision mitigation data regarding the communication in the first network from the communication network control element of the second network, wherein the collision mitigation data are usable for reducing an interference in the communication in the first network, a collision mitigation processing portion configured to process the collision mitigation data and to forward a result of the processing of the collision mitigation data to a network element of the first network.

Furthermore, according to the present example of an embodiment of the proposed solution, there is provided, for example, a method comprising sending communication information regarding a communication in a first network of a first communication technology type to a communication network control element of a second network of a second communication technology type, wherein the communication information concern a frequency selection in the first network, receiving collision mitigation data regarding the communication in the first network from the communication network control element of the second network, wherein the collision mitigation data are usable for reducing an interference in the communication in the first network, processing the collision mitigation data and forwarding a result of the processing of the collision mitigation data to a network element of the first network.

According to further refinements, the proposed solution according to the present example of embodiments may comprise at least one of the following:

the collision mitigation data may comprise a channel index information element indicating at least one frequency channel being improper for a communication in the first network, wherein the collision mitigation processing may further comprise to update a channel table for a frequency hopping procedure to be conducted in the first network to avoid interference, and to inform the network element of the first network about the updated channel table;

alternatively, the collision mitigation data may comprise a sequence transform function usable for modifying an existing frequency hopping sequence used for a communication in the first network, wherein the collision mitigation processing may further comprise to forward the received sequence transform function to the network element of the first network, and to use the received sequence transform function in a sequence transform block for modifying the frequency hopping sequence for selecting a new frequency channel for a communication in the first network;

the communication information regarding the communication in the first network may be sent to the communication network control element of the second network when the first network becomes active;

the first network may include at least one pico network based on a short-range communication technology, in particular Bluetooth, and the second network may include a cellular communication network, wherein the apparatus may be comprised in a communication network element usable as a gateway element between the first network and the second network, the communication network control element of the second network may be a base station of, the cellular network, and the network element of the first network may be a Bluetooth slave node.

Moreover, according to an example of an embodiment of the proposed solution, there is provided, for example, an apparatus comprising a transceiver configured to communicate in a second network of a second communication technology type, a receiver portion configured to receive, from at least one communication network element, communication information regarding a communication of the at least one communication network element in a first network of a first communication technology type, wherein the communication information concern a frequency selection for a communication in the first network, a processing portion configured to process the received communication information for determining collision mitigation data for reducing an interference in the communication in the first network, and a transmitter portion configured to send the collision mitigation data regarding the communication in the first network to the at least one communication network element.

In addition, according to the present example of an embodiment of the proposed solution, there is provided, for example, a method comprising receiving, from at least one communication network element via a connection in a second network of a second communication technology type, communication information regarding a communication of the at least one communication network element in a first network of a first communication technology type, wherein the communication information concern a frequency selection for a communication in the first network, processing the received communication information for determining collision mitigation data for reducing an interference in the communication in the first network, and sending the collision mitigation data regarding the communication in the first network to the at least one communication network element.

According to further refinements, the proposed solution according to the present example of embodiments may comprise at least one of the following:

the processing may further comprise an improper frequency channel prediction processing configured to predict one or more improper frequency channels for a communication in the first network on the basis of the received communication information, wherein the improper frequency channel may be determined to represent a frequency channel where an interference in a communication in the first network occurs, a channel index determination processing configured to determine a channel index information element on the basis of the result of the improper frequency channel prediction processing, the channel index information element indicating at least one frequency channel being improper for a communication in the first network, and an informing processing configured to forward the channel index information element as the collision mitigation data to the at least one communication network element whose communication in the first network is determined to be interfered;

the processing may be further configured to determine whether a number of first networks in a specific area exceeds a predetermined number, and if the determination is positive, to calculate frequency hopping sequences for each of the first networks determined in the specific area, on the basis of communication information received, and to obtain a collision probability for communications in each of the first networks determined in the specific area and for each frequency channel by determining a frequency hopping map of each of the first networks determined in the specific area, comparing the determined frequency hopping maps with each other, and achieving a collision probability of frequency channels on the basis of the comparison;

the processing may be further configured to determine whether the collision probability of frequency channels is higher than a preset threshold, and if the determination is positive, to find a frequency channel having a highest collision probability, to assign the found frequency channel as an improper frequency channel for the related first networks, to repeat the processing for calculating the frequency hopping sequences for each of the first networks determined in the specific area, obtaining a collision probability for communications in each of the first networks determined in the specific area and for each frequency channel, without the found channel, and determining whether the collision probability of the frequency channels is higher than the preset threshold;

the processing portion may comprise a sequence transform function determination processing configured to determine a sequence transform function which is applied to a frequency hopping sequence of a first network, wherein the sequence transform function may be configured to reduce an interference in a communication in the first network, and an informing processing configured to forward the sequence transform function as the collision mitigation data to the at least one communication network element whose communication in the first network is determined to be interfered;

the processing may be further configured to determine whether a number of first networks in a specific area exceeds a predetermined number, and if the determination is positive, to calculate frequency hopping sequences for each of the first networks determined in the specific area, on the basis of communication information received, and to obtain a collision probability for communications in each of the first networks determined in the specific area by determining a frequency hopping map of each of the first networks determined in the specific area, comparing the determined frequency hopping maps with each other, and achieving a collision probability of frequency channels on the basis of the comparison;

the processing may be further configured to determine whether the collision probability of first networks determined in the specific area is higher than a preset threshold, and if the determination is positive, to select one or more of the first networks determined in the specific area having a highest collision probability, to apply at least one type of sequence transform function to the frequency hopping sequences of the selected first networks, and to detect a degree of interference reduction caused by a modification of the frequency hopping sequences of the selected first networks with the applied sequence transform function;

the processing may be further configured, if the degree of interference reduction satisfies a preset minimum reduction, to forward the applied sequence transform function as the collision mitigation data, or if the degree of interference reduction does not satisfy the preset minimum reduction, to apply another type of sequence transform function to the frequency hopping sequences of the selected first networks, and to detect a new degree of interference reduction caused by the modification of the frequency hopping sequences of the selected first networks with the other applied sequence transform function;

the first network may include at least one pica network based on a short-range communication technology, in particular Bluetooth, and the second network may include a cellular communication network, wherein the apparatus may be comprised in a communication network control element of the second network, in particular a base station of the cellular network, the communication network element may be operating as a gateway element between the first network and the second network, and the network element of the first network may be a Bluetooth slave node.

Moreover, according to an example of an embodiment of the proposed solution, there is provided, for example, an apparatus comprising a transceiver configured to communicate in a first network of a first communication technology type, a receiver portion configured to receive from a communication network element collision mitigation data regarding a communication in the first network, wherein the collision mitigation data are usable for reducing an interference in the communication in the first network, wherein the collision mitigation data comprises a sequence transform function usable for modifying an existing frequency hopping sequence used for a communication in the first network, and a processing portion configured to use the received sequence transform function in a sequence transform block for modifying the frequency hopping sequence for selecting a new frequency channel for a communication in the first network.

In addition, according to the present example of an embodiment of the proposed solution, there is provided, for example, a method comprising receiving from a communication network element via a first network of a first communication technology type collision mitigation data regarding a communication in the first network, wherein the collision mitigation data are usable for reducing an interference in the communication in the first network, wherein the collision mitigation data comprises a sequence transform function usable for modifying an existing frequency hopping sequence used for a communication in the first network, and using the received sequence transform function in a sequence transform process for modifying the frequency hopping sequence for selecting a new frequency channel for a communication in the first network.

According to further refinements, the proposed solution according to the present example of embodiments may comprise the following:

the first network may include at least one pico network based on a short-range communication technology, in particular Bluetooth, wherein the apparatus may be comprised in a network element of the first network, in particular a Bluetooth slave node, and the communication network element may be usable as a gateway element between the first network and a second network including a cellular communication network.

In addition, according to examples of the proposed solution, there is provided, for example, a computer program product for a computer, comprising software code portions for performing the steps of the above defined methods, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

By virtue of the proposed solutions, it is possible to effectively mitigate the interference between short-range communication networks, such as BTLE pico networks. In particular, it is possible to reduce a channel collision probability among different short-range communication networks, such as BTLE pico networks. Furthermore, network system throughput in the short-range communication networks, such as BTLE pico networks, can be improved. In addition, by using the communication network element and the communication network control network of the cellular network side, the cellular network can be more tightly converged with the short-range communication network, such as the BILE pico networks, which makes it possible that cellular operator may provide for example sensor network related services or the like.

In addition, according to examples of the invention, the proposed solution can be implemented in existing systems without great effort. For example, since only additional signaling in the cellular link may be needed, and only a channel map is updated when the hopping sequence is updated, signaling overhead is very small minor, while no additional functional block is required on the device side at the BTLE interface.

On the other hand, a complexity of additional functions, such as a sequence transform function, is very small, so that the solution can be implemented rather easily.

The above and still further objects, features and advantages of the invention will become more apparent upon referring to the description and the accompanying drawings.

BRIEF DESCRIPTION OF THE DRAWINGS

FIG. 8 shows a flow chart illustrating a processing according to the second example of embodiments of the invention.

Figure 1:
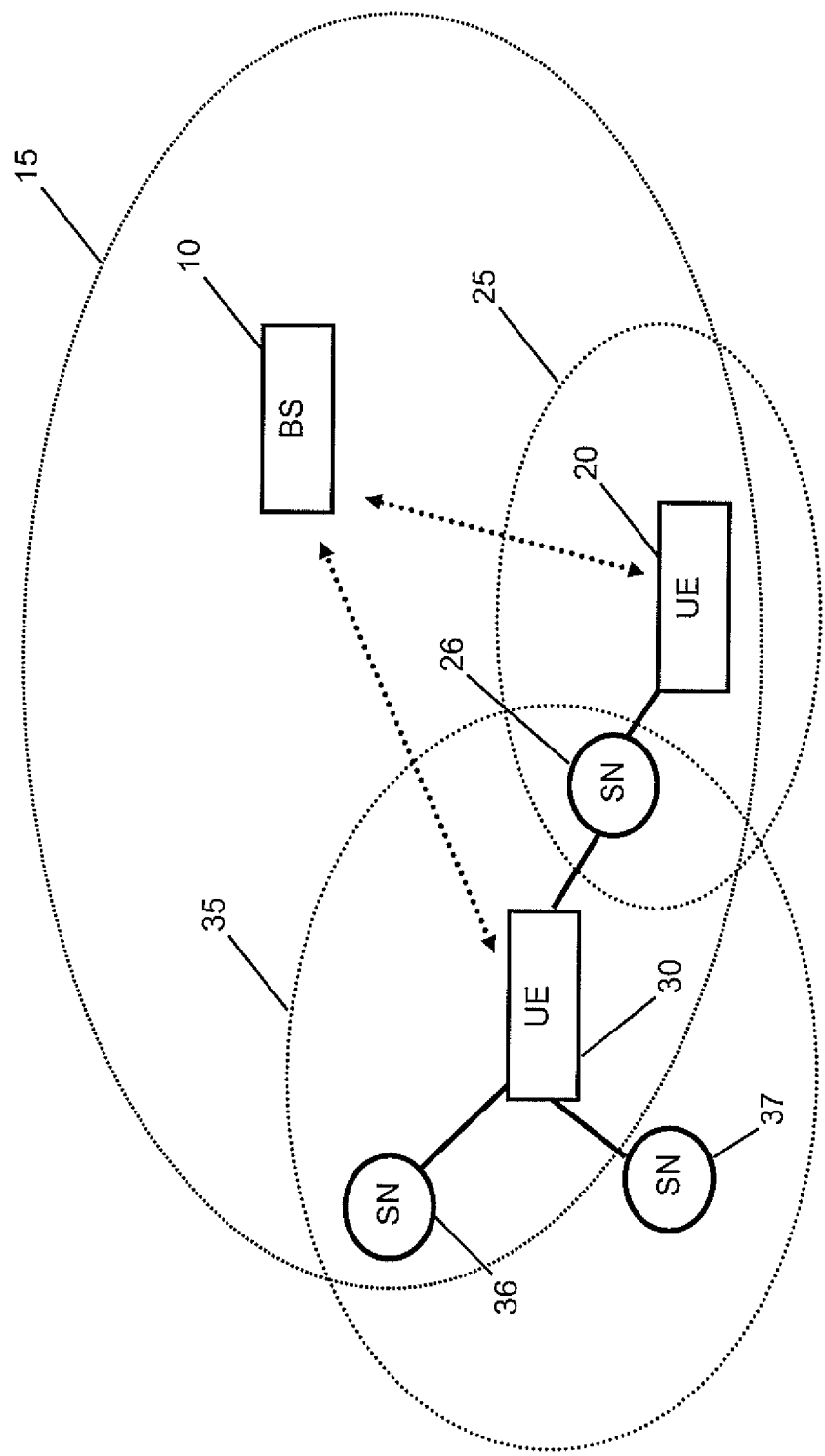
FIG. 1 shows a network structure illustrating a scenario where examples of embodiments of the invention are applied.

DESCRIPTION OF PREFERRED
EMBODIMENTS

In the following, examples and embodiments of the present invention are described with reference to the drawings. For illustrating the present invention, the examples and embodiments will be described in connection with a short-range communication network such as a BT or BTLE based network as a first network type, and a cellular communication system which may be based on a 3GPP based architecture as a second network type. However, it is to be noted that the present invention is not limited to an application using such types of communication system, but is also applicable in other types of communication systems and the like.

A basic system architecture of a communication network may comprise a commonly known architecture of a communication system comprising a wired or wireless access network subsystem and a core network. Such an architecture may comprise one or more access network control elements, radio access network elements, access service network gateways or base transceiver stations, such as a base station (BS), with which a communication network element or device such as a UE or another device having a similar function, such as a modem chipset, a chip, a module etc., which can also be part of a UE or attached as a separate element to a UE, or the like, is capable to communicate via one or more channels for transmitting several types of data. Furthermore, core network elements such as gateway network elements, policy and charging control network elements, mobility management entities and the like are usually comprised. With regard to the short-range communication network, a typical master-slave scheme may be employed, wherein according to examples of embodiments of the invention the cellular UE is at the same time a master node or gateway node of a BT pico network, for example. The general functions and interconnections of the described elements, depending on the actual network type, are known to those skilled in the art and described in corresponding specifications so that a detailed description thereof is omitted herein. However, it is to be noted that several additional network elements and signaling links may be employed for a communication connection to or from UEs or BSs, besides those described in detail herein below.

Furthermore, the described network elements, such as communication network elements like UEs or communication network control elements like BSs or eNBs (access network control elements or base stations), or the slave nodes of the BT pico networks, and the like, as well as corresponding functions as described herein may be implemented by software, e.g. by a computer program product for a computer, and/or by hardware. In any case, for executing their respective functions, correspondingly used devices and network elements may comprise several means and components (not shown) which are required for control, processing and communication/signaling functionality. Such means may comprise, for example, one or more processor units including one or more processing portions for executing instructions, programs and for processing data, memory means for storing instructions, programs and data, for serving as a work area of the processor or processing portion and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit or portion (e.g. wired and wireless interface means, an antenna, etc.) and the like. It is to be noted that in the present specification processing portions should not be only considered to represent physical portions of one or more processors, but may also be considered as a logical division of the referred processing tasks performed by one or more processors.

In FIG. 1, a network structure is shown which illustrates a scenario where examples of embodiments of the invention are applied. Specifically, in FIG. 1, reference sign 10 denotes a communication network control element, such as a base station, of a cellular communication network 15, like a 3GPP based wireless network. In the coverage area of the base station 10, one or more UEs may be located, such as UE 20 and UE 30.

The UEs 20 and 30 may in turn be master nodes or gateway nodes of a corresponding pico network of another communication network type, such as BT or BTLE based pico networks 25 and 35. In each of the BT or BTLE based pico networks 25 and 35, slave nodes SN 26, 36 and 37 may be present which are linked to a corresponding master node, i.e. to UE 20 or UE 30 in the present scenario. It is to be noted that a slave node may be linked with more than one master node, such as SN 26, or that one master node may be linked to more than one slave node, such as UE 30. The scenario according to FIG. 1 shows a rather simple case in order to facilitate explanation of the present invention.

According to examples of embodiments of the invention, in order to mitigate interference in the communication network as shown in FIG. 1, an interference mitigation processing conducted in a coordinator element is employed. Specifically, according to examples of embodiments of the invention, the communication network control element, i.e. the BS 10, of the cellular network is used to coordinate a collision avoidance processing in the different short-range communication networks, i.e. the BT or BILE based pico networks. Thus, in contrast to conventional BTLE networks, there is a coordinating element which is able to determine collisions between the pico networks and to control communication parameters such a frequency hopping settings in order to reduce the interference channel collision between the BTLE pico networks in an effective manner.

A first example of embodiments of the invention is described below with regard to FIGS. 2 to 5.

Figure 2:
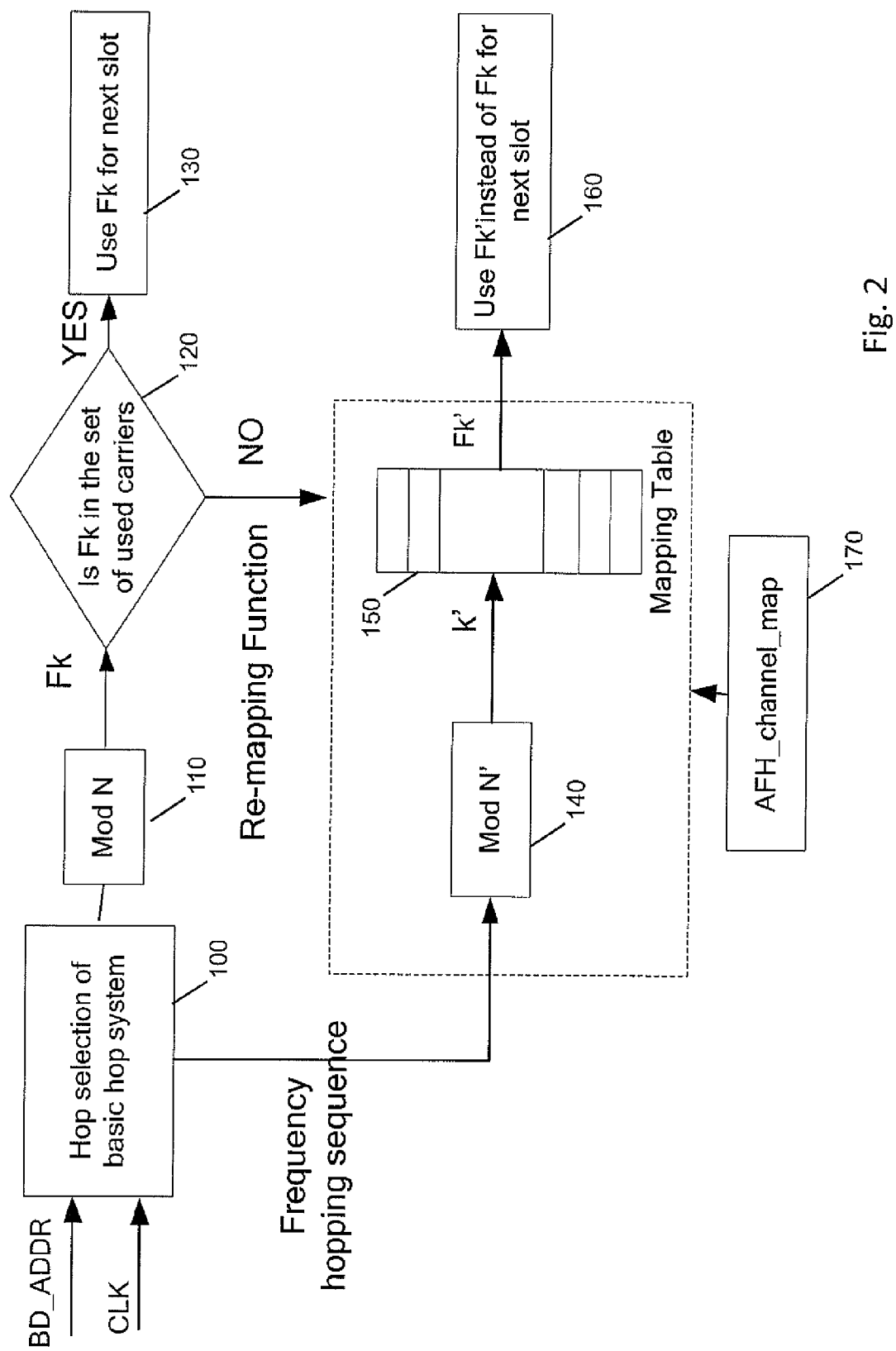
FIG. 2 shows an example of an adaptive frequency hopping system for a BTLE based network on which examples of embodiments of the invention are based.

FIG. 2 shows an example of an adaptive frequency hopping system for a BTLE based network. As indicated in FIG. 2, the input of the system is the address of the BTLE device BD_ADDR and the time clock in a block 100 executing a hop selection (basic hop system), and the AFH channel map 170. The AFH channel mapping includes lists of good and bad channels that the BTLE system detected itself by previous information.

If the selected frequency Fk from basic hopping system (after a modulo N operation in block 110) is determined in block 120 as representing a usable channel (also sometimes referred to as a "good" channel), i.e. Fk is in the set of used carriers, the selected frequency Fk is used for the next slot (block 130).

On the other hand, if the selected frequency Fk from basic hopping system (after a modulo N operation in block 110) is determined in block 120 as representing a bad channel, wherein the parameter N indicates the number of all defined channels (decision in block 120 is NO), a re-mapping function will be activated to re-select a channel from the usable channel group. For this purpose, the frequency hopping sequence from block 100 is input in the re-mapping function, a parameter k' is achieved after a modulo N' operation in block 140 (the parameter N' in the re-mapping function is the size of the mapping table which includes all usable channels) and a determination of another frequency Fk' in a mapping table 150. Since the mapping table 150 comprises only usable channels, the final selection Fk' is always a usable channel, and the selected frequency Fk' us used in block S280 instead of the (bad) frequency Fk.

Figure 3:
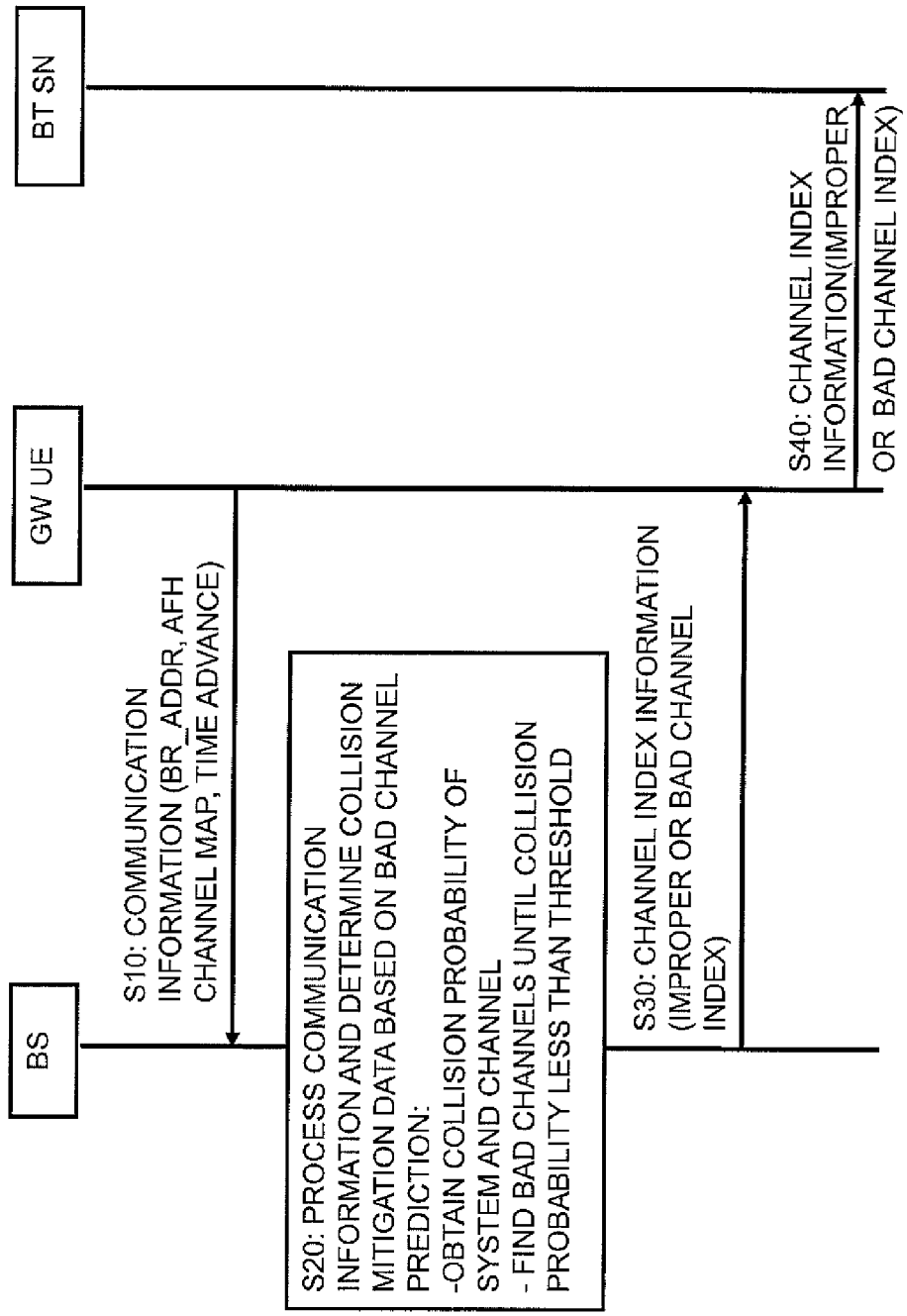
FIG. 3 shows a signaling diagram illustrating a first example of embodiments of the invention.

FIG. 3 shows a signaling diagram illustrating a first example of embodiments of the invention where a BS coordinated collision mitigation scheme is depicted.

Specifically, as shown in FIG. 3, each gateway UE (i.e. UE 20 and UE 30) reports to the BS 10 in step S10 communication information related to the communication in the short-range communication network, i.e. the respective BILE pico networks 25 and 35. For example, the communication information of each UE may comprise information related to the BD_ADDR, time clock information and the AFH channel map of its BTLE pico-net. Furthermore, the message in step S10 may include time advance information of the cellular interface of the respective UE to the BS 10 when the pico network became active, in particular in case the UE was in idle mode.

When receiving the communication information, in step S20, the BS 10 processes the communication information. According to present examples of embodiments of the invention, the BS 10 determines collision mitigation data, i.e. data on the basis of which the interference in the BTLE pico networks can be reduced, on the basis of a prediction of bad channel for the pico networks in a the same area (i.e. for pico networks 25 and 35 as shown in FIG. 1, for example) according to the frequency hopping sequence of each pico-net. That is, the BS 10 may obtain a collision probability of the pico network system and each channel and find the bad channels. By excluding the bad channels in a further prediction of the collision probability, the resulting collision probability can be reduced. This reduction is executed until a desired degree, for example. On the basis of the found bad channels, a channel index information element can be generated indicating these found bad channels.

When the resulting collision probability (i.e. after excluding found channels) is satisfying, the BS sends the generated channel index information element in step S30 to the UEs in question. The channel index information may be sent in any feasible format to the gateway UEs 20 and 30 of the related pico-nets, for example as separate signaling or in combination with another signaling.

When the related gateway UEs 20 and 30 receive the channel index information, a corresponding channel table of the AFH system is updated in the UE 20 and 30. Then, in step S40, the updated channel table is sent to corresponding slave nodes SN via the BILE interface of the UEs.

Figure 4:
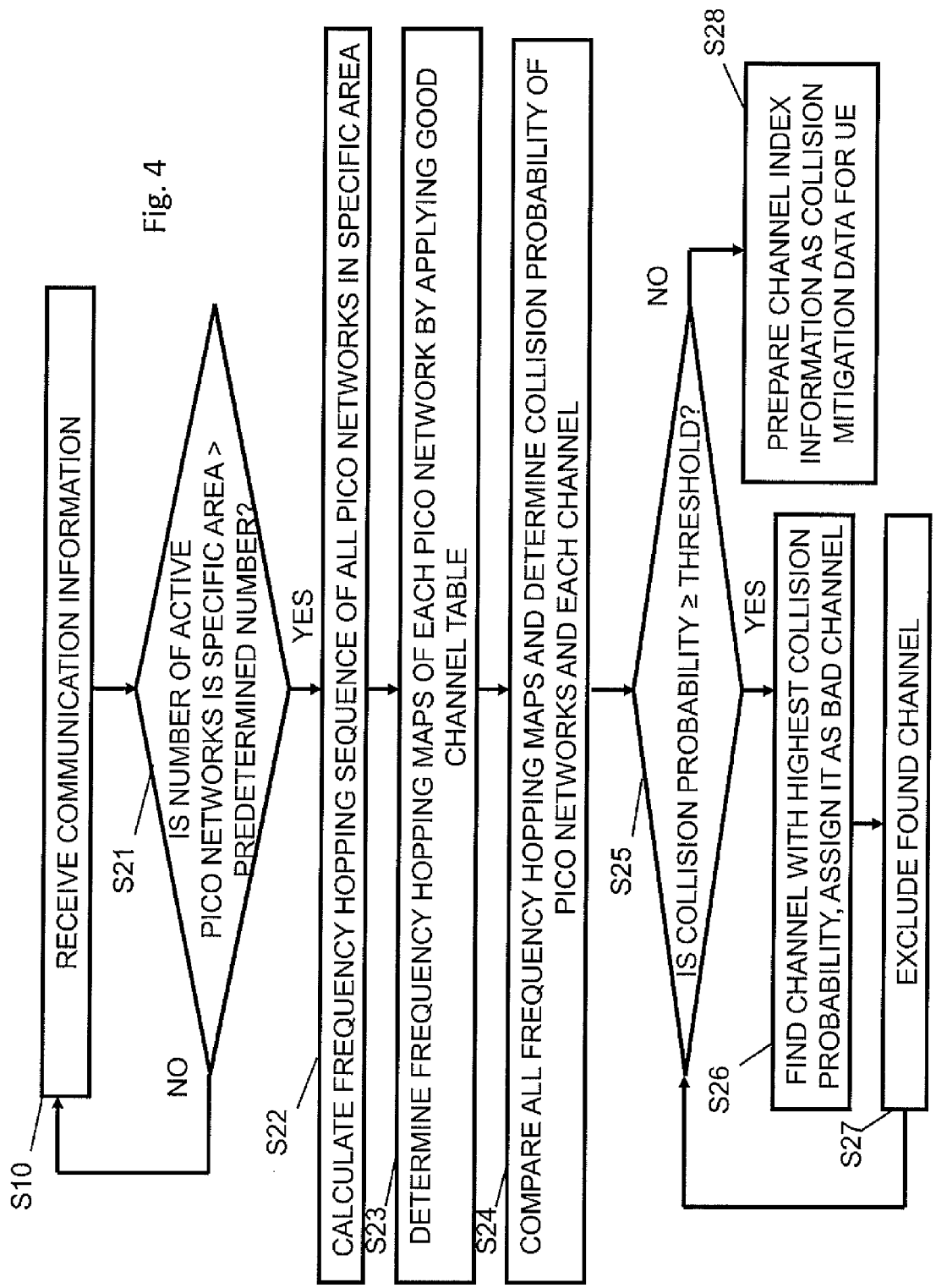
FIG. 4 shows a flow chart illustrating a processing according to the first example of embodiments of the invention.

FIG. 4 shows a flow chart illustrating a processing according to the first example of embodiments of the invention. Specifically, FIG. 4 shows a processing according to step S20 of FIG. 3 executed in the BS 10, for example.

According to FIG. 4, in step S10, the BS receives from each gateway UE the communication information including, for example, information of the BD_ADDR, the time clock, the AFH channel map of the BILE interface and the time advance of the cellular interface to the BS 10 when the BT pico network becomes active. In step S21, the BS 10 determines whether the number of active BTLE pico networks at the same area is more than a predetermined number or threshold. In the decision in step S21 is NO, the processing returns and awaits the receipt of further communication information of other UEs. If the decision in step S21 is YES, e.g. when more than one (or any other number) active pico-network are active, the BS proceeds to step S22.

In step S22, the BS 10 calculates the frequency hopping sequences of all pico networks in the specific area, of which information are received, i.e. on the basis of the received BD_ADDR of each pico network, for example.

Then, in step S23, the frequency hopping map of each pico network is obtained by applying the usable channel table to the calculated frequency hopping sequence of the respective pico network.

In step S24, by comparing all of the obtained hopping maps, the BS 10 is able to determine a collision probability of the set of pico networks and each channel.

Then, in step S25, it is determined whether the determined collision probability is larger than a preset threshold. If the decision is YES, the BS 10 finds the channel (or channels) having the highest collision probability. This found channel is then assigned as a bad channel to those pico networks which collide most at this channel.

In step S26, the found channel is excluded from the further consideration, e.g. deleted from a list of channel candidates usable in the further processing. Then, steps 24 and S25 are repeated in order to determine whether the collision probability determined without considering the found channel becomes smaller than the preset threshold. In other words, the processing according to steps S24 to S27 are repeated until the resulting collision probability becomes smaller than the preset threshold.

If the decision in step S25 is NO, i.e. when the determined collision probability is smaller than the preset threshold, the processing proceeds to step S28 in which the BS 10 prepares a channel index information element on the basis of the found bad channels (i.e. the channels excluded in step S27) as collision mitigation data for informing the UEs being the GW nodes (master nodes) of related pico networks about the bad channels. On the basis of this channel index information element, the UEs 20 and 30 can update their respective channel table of AFH algorithm and update the channel table to its slave nodes by using, for example, an existing BTLE procedure.

It is to be noted that in case the first determination in step S25 results in that the channel collision probability is smaller than the preset threshold, step S28 may be omitted, i.e. no collision mitigation data may be sent to the UEs, since the current settings are sufficient.

Figure 5:
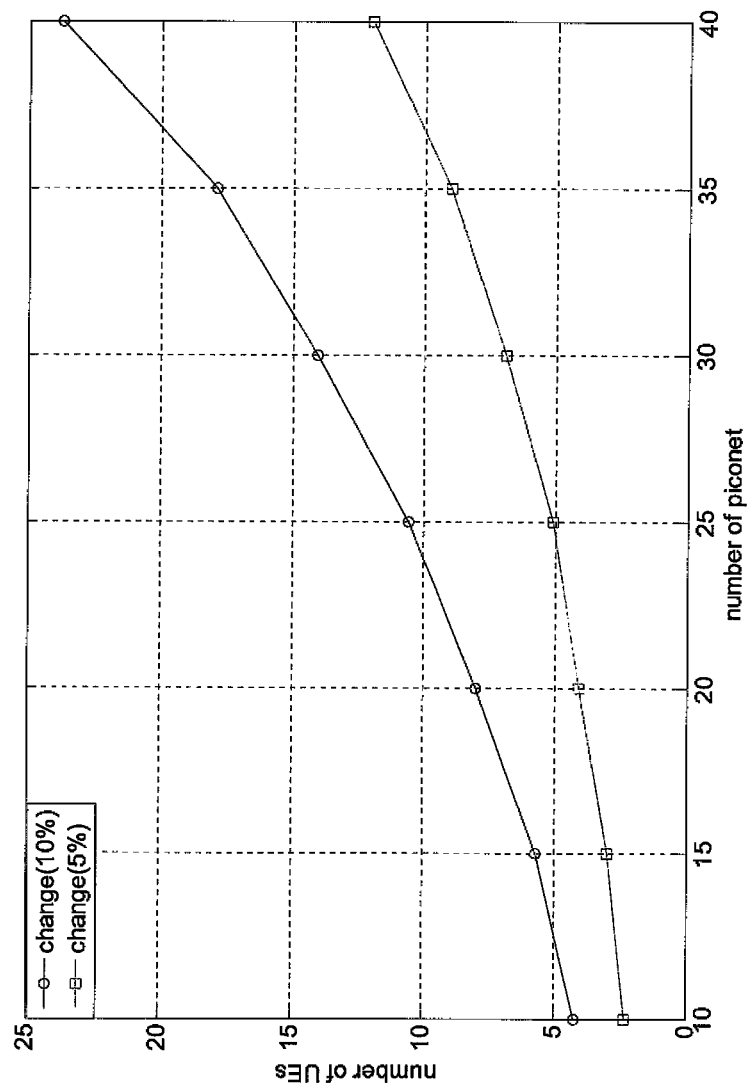
FIG. 5 shows a diagram illustrating a result achieved by implementing the first example of embodiments of the invention.

FIG. 5 shows a diagram illustrating a result achieved by implementing the first example of embodiments of the invention. In a simulation based on the first example of embodiments of the invention, a hopping sequence with a length of 200 time slots is used, wherein the collision probability threshold (step S25) is set as 5% and 10% lower than in a conventional BTLE network, respectively. As shown in FIG. 5, the average number of touched gateway UEs which needs to be informed about the bad channel index is depicted in accordance with the number of BTLE pico networks assumed to be in the same specific area to be considered, wherein the upper curve represent the result for a collision probability threshold set as −10% while the lower curve represents the result for a collision probability threshold set as −5%. According to FIG. 5, there are shown measurement results of a signaling overhead introduced to the downlink in correspondence with steps S28 and S30 of FIGS. 4 and 3, respectively.

As can be seen in FIG. 5, when the number of pico networks is e.g. 20 and the collision probability is −5% and −10%, approximately four and seven master nodes or GW UEs have to be informed about the channel index information element, respectively. The number of touched GW UE is increased along with the number of pico networks.

As illustrated in the first example of embodiments described in connection with FIGS. 2 to 5, there is no need to introduce any additional functional block in the gateway UE and in the slave node of the BTLE pica network.

A second example of embodiments of the invention is described below with regard to FIGS. 6 to 9. While in the first example a scheme based on a bad channel prediction is described, according to the second example, a scheme will be described which is based on a sequence transformation.

Figure 6:
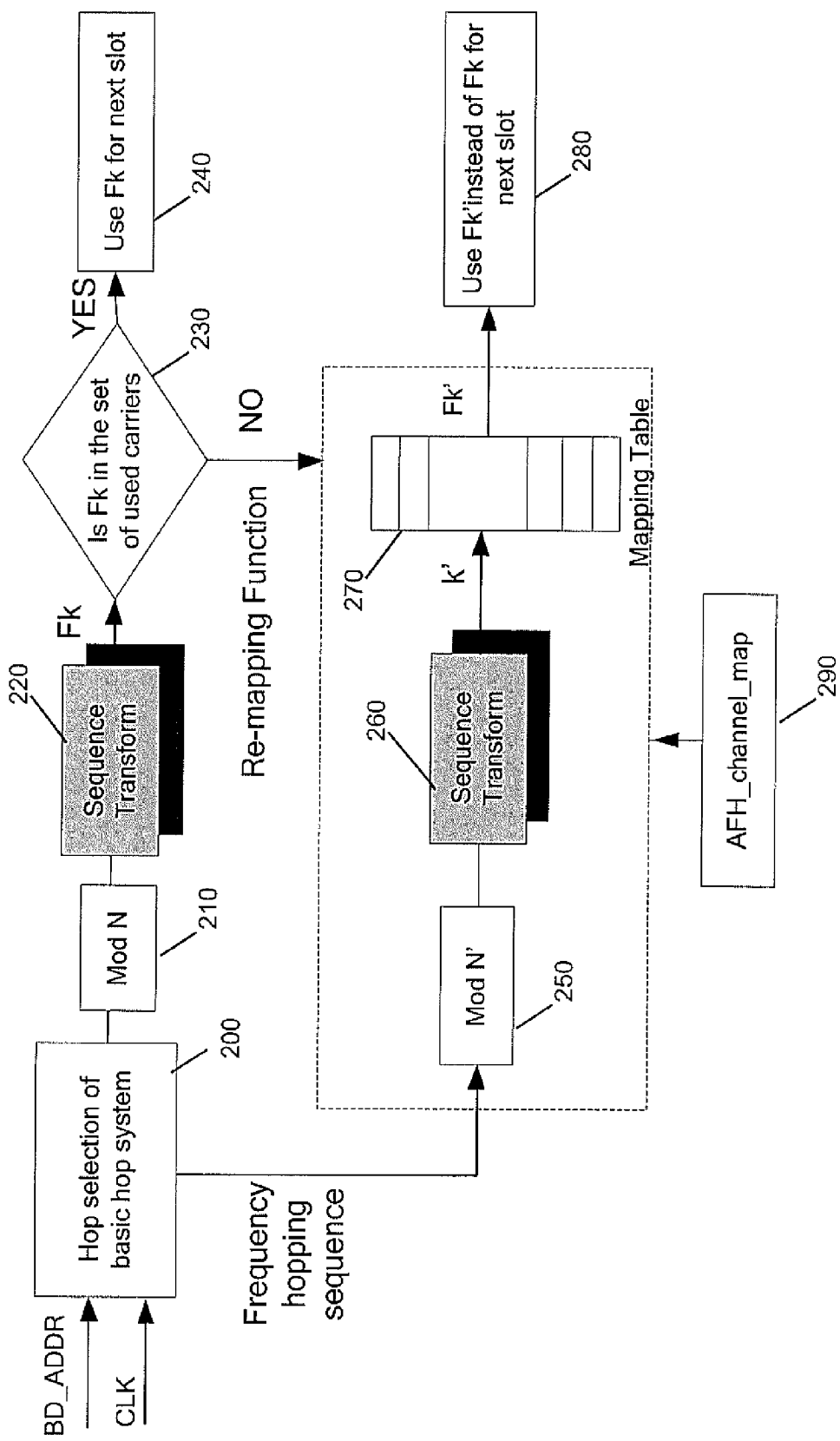
FIG. 6 shows another example of an adaptive frequency hopping system for a BTLE based network on which other examples of embodiments of the invention are based.

FIG. 6 shows an example of an adaptive frequency hopping system for a BTLE based network. As indicated in FIG. 6, the basic concept of the adaptive frequency hopping system is similar to that described in connection with FIG. 2. However, in contrast to the system of FIG. 2, the system according to the second example of embodiments comprises additional blocks in which a sequence transformation is conducted.

As indicated in FIG. 6, the input of the system is again the address of the BTLE device BD_ADDR and the time clock in a block 200 executing a hop selection (basic hop system), and the AFH channel map 290. The AFH channel mapping includes lists of good and bad channels that the BTLE system detected itself by previous information.

If the selected frequency Fk from basic hopping system (after a modulo N operation in block 210) and a sequence transformation in block 220 is determined in block 230 as representing a usable channel, i.e. Fk is in the set of used carriers, the selected frequency Fk is used for the next slot (block 240).

On the other hand, if the selected frequency Fk from basic hopping system (after a modulo N operation in block 210) and a sequence transformation in block 220 is determined in block 230 as representing a bad channel, wherein the parameter N indicates the number of all defined channels (decision in block 230 is NO), a re-mapping function will be activated to re-select a channel from the usable channel group. For this purpose, the frequency hopping sequence from block 200 is input in the re-mapping function, a parameter k' is achieved after a modulo N' operation in block 250 and a sequence transformation in block 260 (the parameter N' in the re-mapping function is the size of the mapping table which includes all usable or "good" channels) and a determination of another frequency Fk' in a mapping table 270. Since the mapping table 270 comprises only usable channels, the final selection Fk' is always a usable channel, and the selected frequency Fk' us used in block S280 instead of the (bad) frequency Fk.

Figure 7:
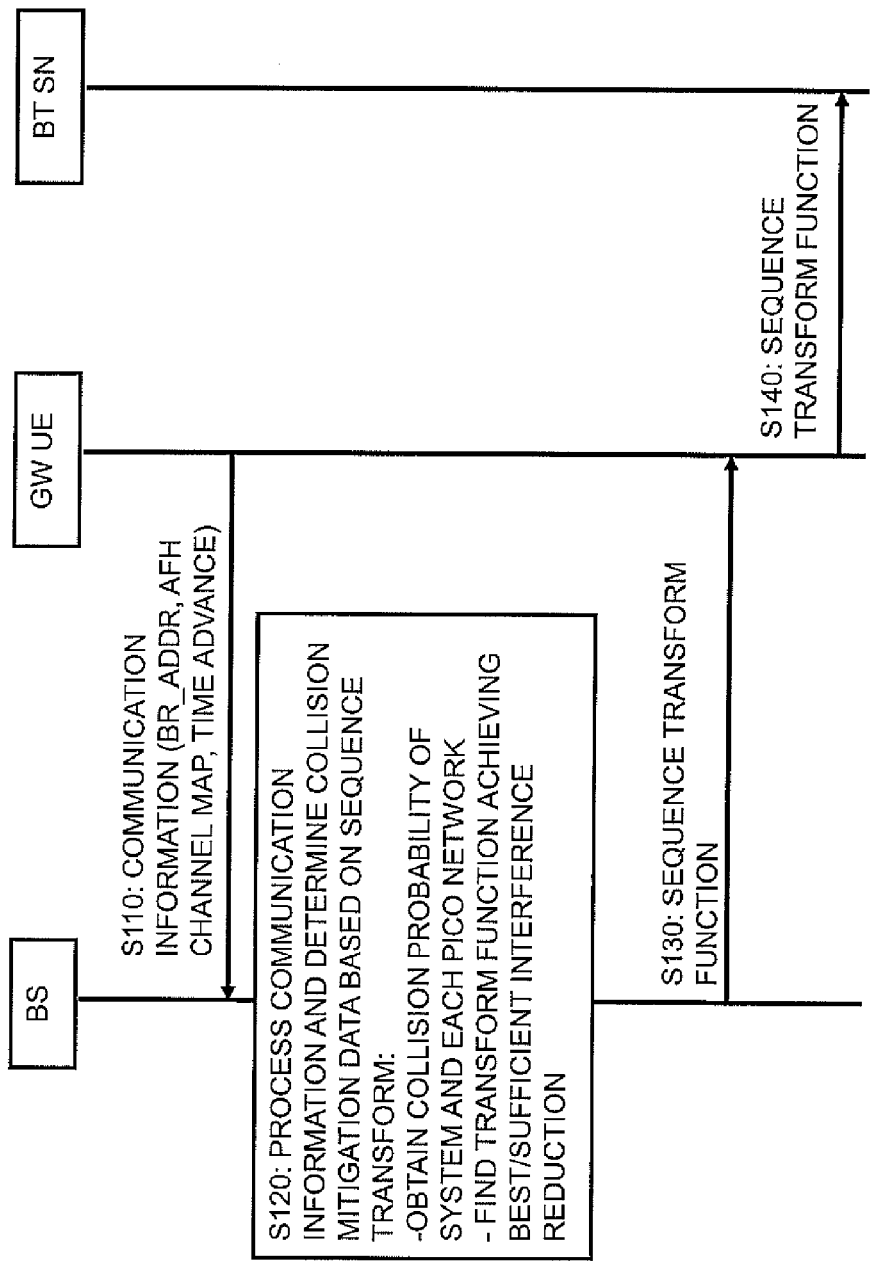
FIG. 7 shows a signaling diagram illustrating a second example of embodiments of the invention.

FIG. 7 shows a signaling diagram illustrating the second example of embodiments of the invention where a further BS coordinated collision mitigation scheme is depicted.

Specifically, as shown in FIG. 7, each gateway UE (i.e. UE 20 and UE 30) reports to the BS 10 in step S110 communication information related to the communication in the short-range communication network, i.e. the respective BTLE pico networks 25 and 35. For example, the communication information of each UE may comprise information related to the BD_ADDR, time clock information and the AFH channel map of its BTLE pico network. Furthermore, the message in step S110 may include time advance information of the cellular interface of the respective UE to the BS 10 when the pico network became active, in particular in case the UE was in idle mode.

When receiving the communication information, in step S120, the BS 10 processes the communication information. According to present examples of embodiments of the invention, the BS 10 determines collision mitigation data, i.e. data on the basis of which the interference in the BTLE pica networks can be reduced, on the basis of a sequence transformation determination result. That is, the BS 10 may obtain a collision probability of the pico network system and each pico network and find a transform function which achieves a best or at least sufficient interference reduction.

For example, the BS 10 optimizes the frequency hopping sequences of all pico networks by selecting a suitable sequence transform function, and sends the sequence transform function to several related gateway UEs. The sequence transform function may be, for example, a number of bit shift, an inverse of sequence, etc. Different transform functions may be encoded into several bits as a corresponding indicator. On the basis of the selected sequence transform function, collision mitigation data may be generated and sent to the related GW UEs 20 and 30 in step S130.

When the related gateway UEs 20 and 30 receive the sequence transform function, they implement the sequence transform function in the sequence transform block (e.g. corresponding to blocks 220 and 260) of the AFH system. Then, in step S140, the sequence transform function is also sent to corresponding slave nodes SN via the a control channel of the BTLE pico network.

It is to be noted that the sequence transform block is to be applied in the AFH system before selecting the frequency from AFH channel mapping table in both the master nodes (GW UEs) and the slave nodes of BTLE devices.

FIG. 8 shows a flow chart illustrating a processing according to the second example of embodiments of the invention. Specifically, FIG. 8 shows a processing according to step S120 of FIG. 7 executed in the BS 10, for example.

According to FIG. 8, in step S110, the BS receives from each gateway UE the communication information including, for example, information of the BD_ADDR, the time clock, the AFH channel map of the BTLE interface and the time advance of the cellular interface to the BS 10 when the BT pico network becomes active. In step S121, the BS 10 determines whether the number of active BTLE pico networks at the same area is more than a predetermined number or threshold. In the decision in step S121 is NO, the processing returns and awaits the receipt of further communication information of other UEs. If the decision in step S121 is YES, e.g. when more than one (or any other number) active pico-network are active, the BS proceeds to step S122.

In step S122, the BS 10 calculates the frequency hopping sequences of all pico networks in the specific area, of which information are received, i.e. on the basis of the received BD_ADDR of each pico network, for example.

Then, in step S123, the frequency hopping map of each pico network is obtained by applying the usable channel table to the calculated frequency hopping sequence of the respective pico network.

In step S124, by comparing all of the obtained hopping maps, the BS 10 is able to determine a collision probability of the set of pico networks and each pica network.

Then, in step S125, it is determined whether the determined collision probability is larger than a preset threshold. If the decision is YES, the BS 10 selects a specific number of pica networks having the highest collision probability. For example the BS 10 selects m pico-nets (e.g. m=1, 5, 10, etc.) with the largest collision probability. Then it applies one of plural available sequence transform functions, e.g. the bit shift function, to the hopping sequences of the selected m pico networks in order to reduce the total collision probability of the set of pico networks. When applying the sequence transform function, the achieved degree of reduction is detected.

In step S127, it is decided whether the detected degree of reduction is sufficient or not, e.g. whether it is equal to or greater than a threshold reduction degree. If the decision in step S127 is NO, another or an additional sequence transform function is selected and applied to the hopping sequences of the selected m pico networks in order to reduce the total collision probability of the set of pico networks, wherein the achieved reduction is again detected and judged in step S127. In other words, the processing according to steps S126 to S127 are repeated until the resulting degree of reduction becomes sufficient.

If the decision in step S127 is YES, i.e. the degree of reduction achieved by the applied sequence transform function is sufficient, the process proceeds to step S128 in which the collision mitigation data is prepared on the basis of the selected sequence transform function which achieves the sufficient degree of reduction of the interference. For example, an indicator indicating the respective sequence transformation as mentioned above can be included in the collision mitigation data. On the basis of this indication for the sequence transform function, the related GW UEs 20 and 30 can use it in the sequence transformation block of the AFH system and forward the information regarding the sequence transform function to the slave nodes by using, for example, a control channel of the BTLE pico network.

It is to be noted that in case the determination in step S125 results in that the channel collision probability is smaller than the preset threshold, step S128 may be omitted, i.e. no collision mitigation data may be sent to the UEs, since the current settings are sufficient, or the indication sent in collision mitigation data prepared in step S128 may indicate no sequence transformation.

Figure 9A:
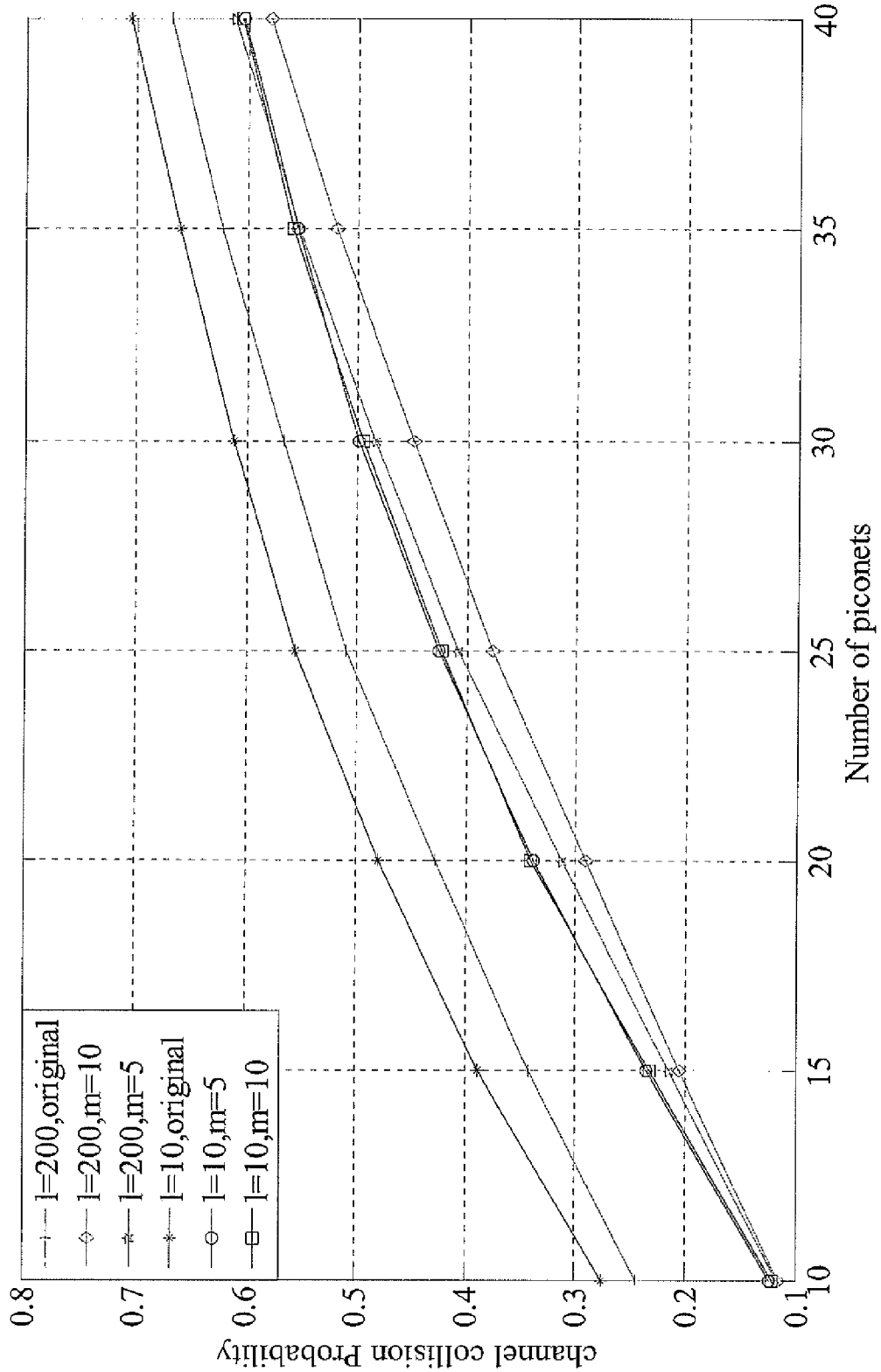
FIGS. 9a and 9b show diagrams illustrating a result achieved by implementing the second example of embodiments of the invention.
Figure 9B:
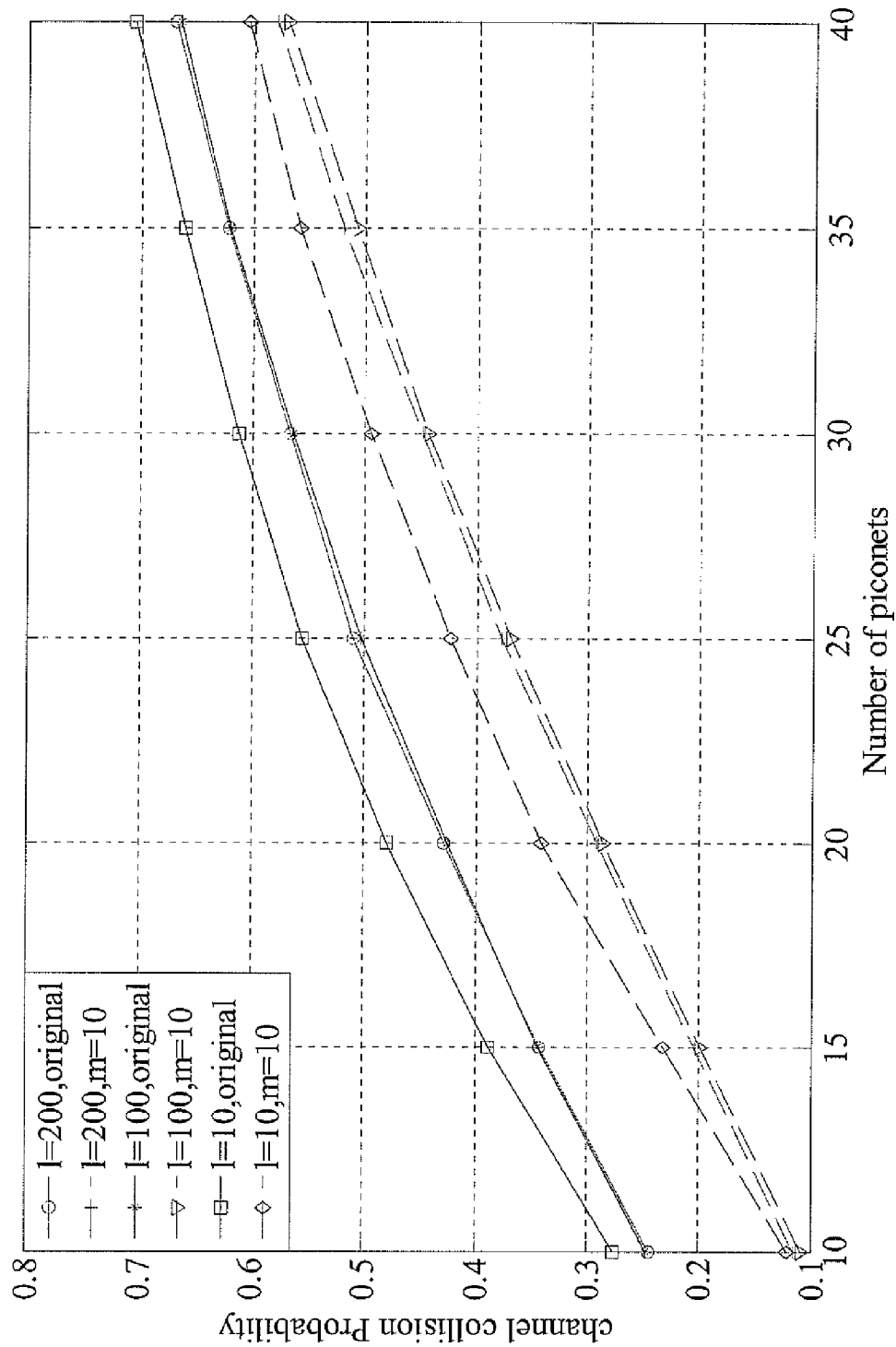

FIGS. 9a and 9b show diagrams illustrating a result achieved by implementing the second example of embodiments of the invention. Specifically, FIGS. 9a and 9b illustrate the channel collision probability when the frequency hopping sequence of m pico-nets (m=5 and 10 in the FIG. 9a and m=10 in FIG. 9b) is transformed by bit shifting. A hopping sequence length l is set to be 200 and 10 time slots in FIG. 9a, while in FIG. 9b a result with a hopping sequence length l of 200, 100 and 10 time slots, respectively is shown (for the sake of understanding, FIG. 9a is related to a comparison between two different values of l and three different values for m, while FIG. 9b is related to a comparison of three different values of l and two different values for m). It is assumed that the most effective bit shift mechanism is used as the transform function.

When the number of pico-networks is e.g. 20 and the hopping sequence length is 200, the collision probability decreases about 20% when m=5, i.e., the collision problem could be resolved dramatically by optimizing the frequency hopping sequence with a sort of sequence transform function in all the relevant nodes. In addition, as indicated in FIG. 9a, an increasing m will reduce the collision probability, but not significantly. FIG. 9b shows for comparison reasons also results when a shorter hopping sequence length (l=100, l=10) is assumed.

Figure 10:
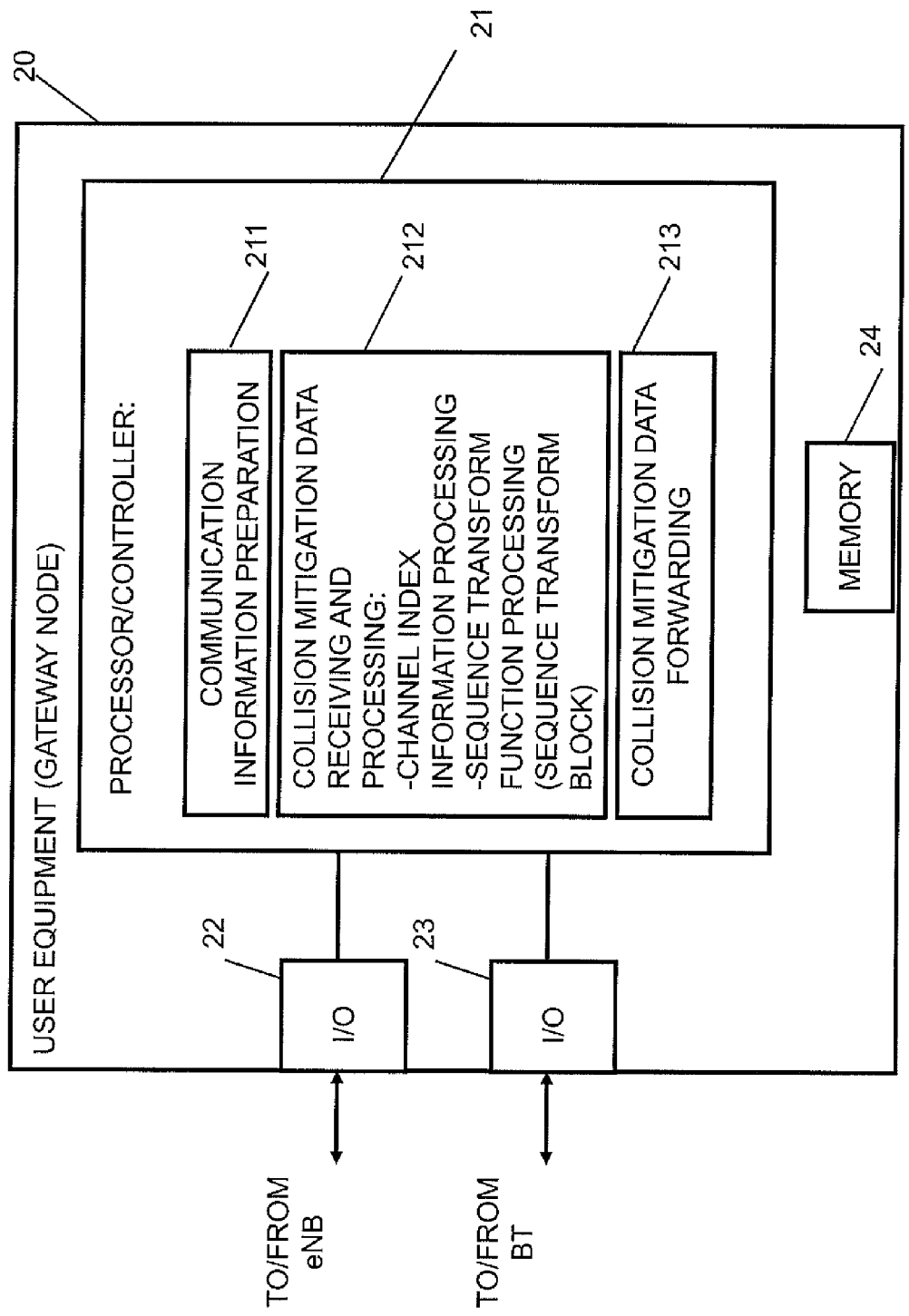
FIG. 10 shows a block circuit diagram of a communication network element according to examples of embodiments of the invention.

In FIG. 10, a block circuit diagram illustrating a configuration of a communication network element, such as of UE 20, is shown, which is configured to implement the processing as described in connection with the first or second examples of embodiments of the invention, for example. It is to be noted that the communication network device or UE 20 shown in FIG. 10 may comprise several further elements or functions besides those described herein below, which are omitted herein for the sake of simplicity as they are not essential for understanding the invention. Furthermore, even though reference is made to a UE, the communication network element may be also another device having a similar function, such as a modem chipset, a chip, a module etc., which can also be part of a UE or attached as a separate element to a UE, or the like.

The communication network element or UE 20 may comprise a processing function or processor 21, such as a CPU or the like, which executes instructions given by programs or the like related to the power control. The processor 21 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference signs 22 and 23 denote transceiver or input/output (I/O) units connected to the processor 21. The I/O units 22 and 23 may be used for communicating with the cellular network, such as a communication network control element like a BS, or with the BTLE network element, such as a slave node. The I/O units 22 and 23 may be a combined unit comprising communication equipment towards several of the network element in question, or may comprise a distributed structure with a plurality of different interfaces for each network element in question. Reference sign 24 denotes a memory usable, for example, for storing data and programs to be executed by the processor 21 and/or as a working storage of the processor 21.

The processor 21 is configured to execute processing related to the above described mechanism for mitigating interference in the BTLE network. In particular, the processor 21 comprises a sub-portion 211 as a processing portion which is usable as a communication information preparation section which prepares the communication information of the BTLE pico network to be sent to the BS. The portion 211 may be configured to perform processing according to steps S10 and S110 according to FIGS. 3 and 7, for example. Furthermore, the processor 21 comprises a sub-portion 212 as a processing portion which is usable as a receiving and processing section for the collision mitigation data. Moreover, the processor 21 comprises a sub-portion 213 as a processing portion which is usable as a collision mitigation data forwarding section for sending the collision mitigation data (or a processing result thereof) to the slave nodes of the BTLE pico network. Sub-portion 211 may also referred to as fulfilling a function of a transmitter portion, and sub-portion 212 may also referred to as receiver portion.

Figure 11:
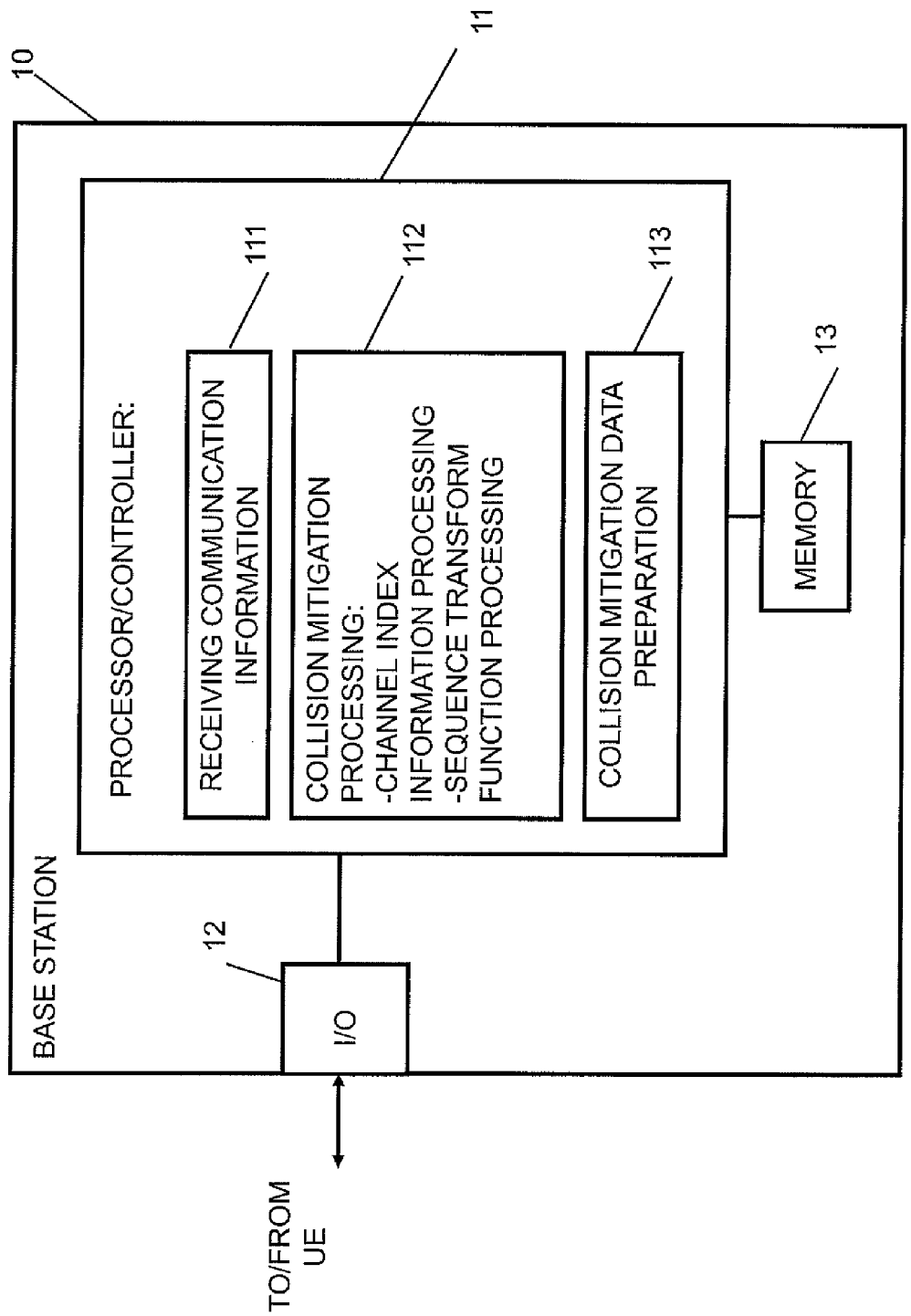
FIG. 11 shows a block circuit diagram of a communication network control element according to examples of embodiments of the invention.
Figure 12:
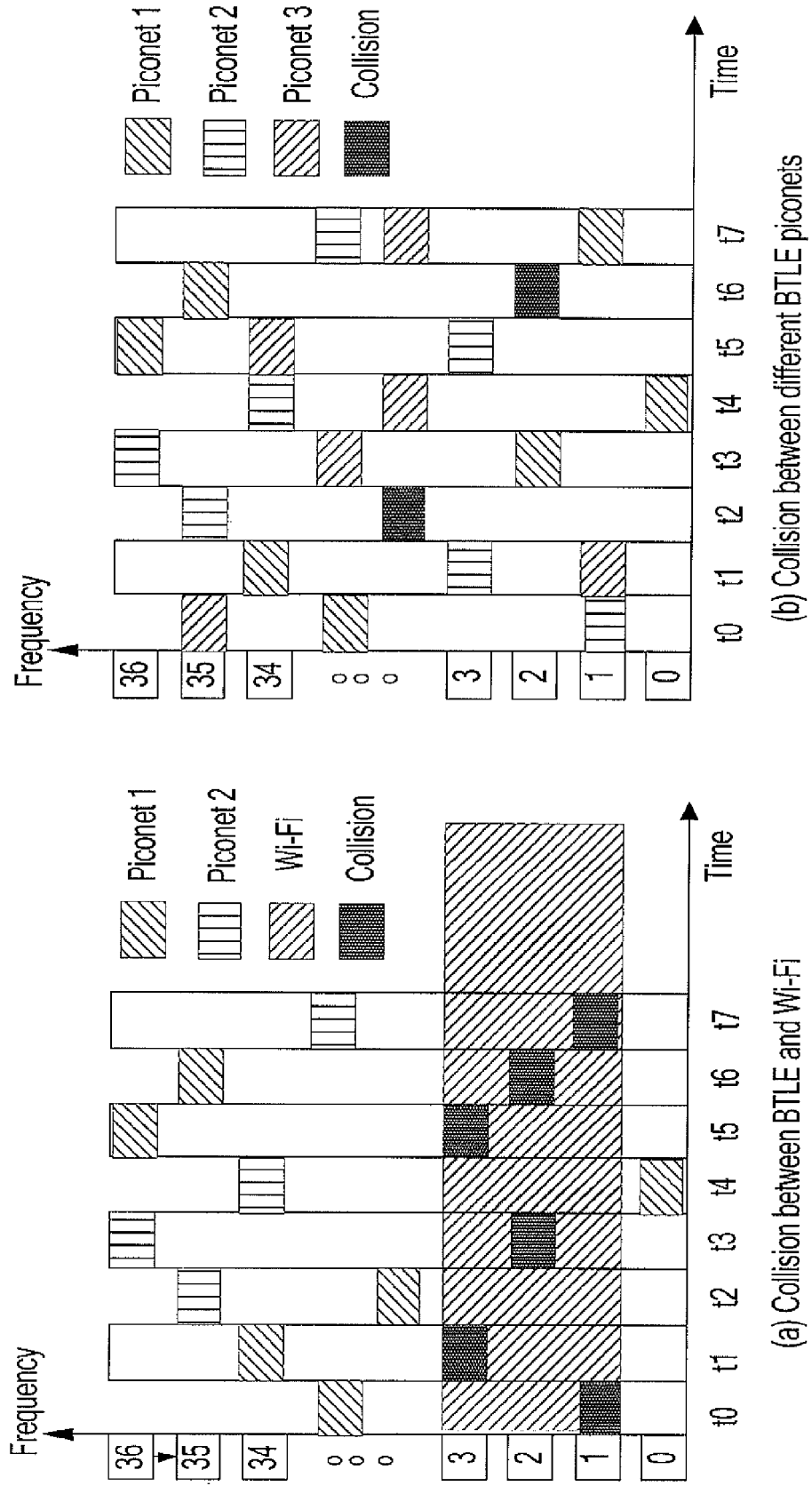
FIGS. 12*a* and 12*b* show diagrams illustrating different interference cases.
Figure 13:
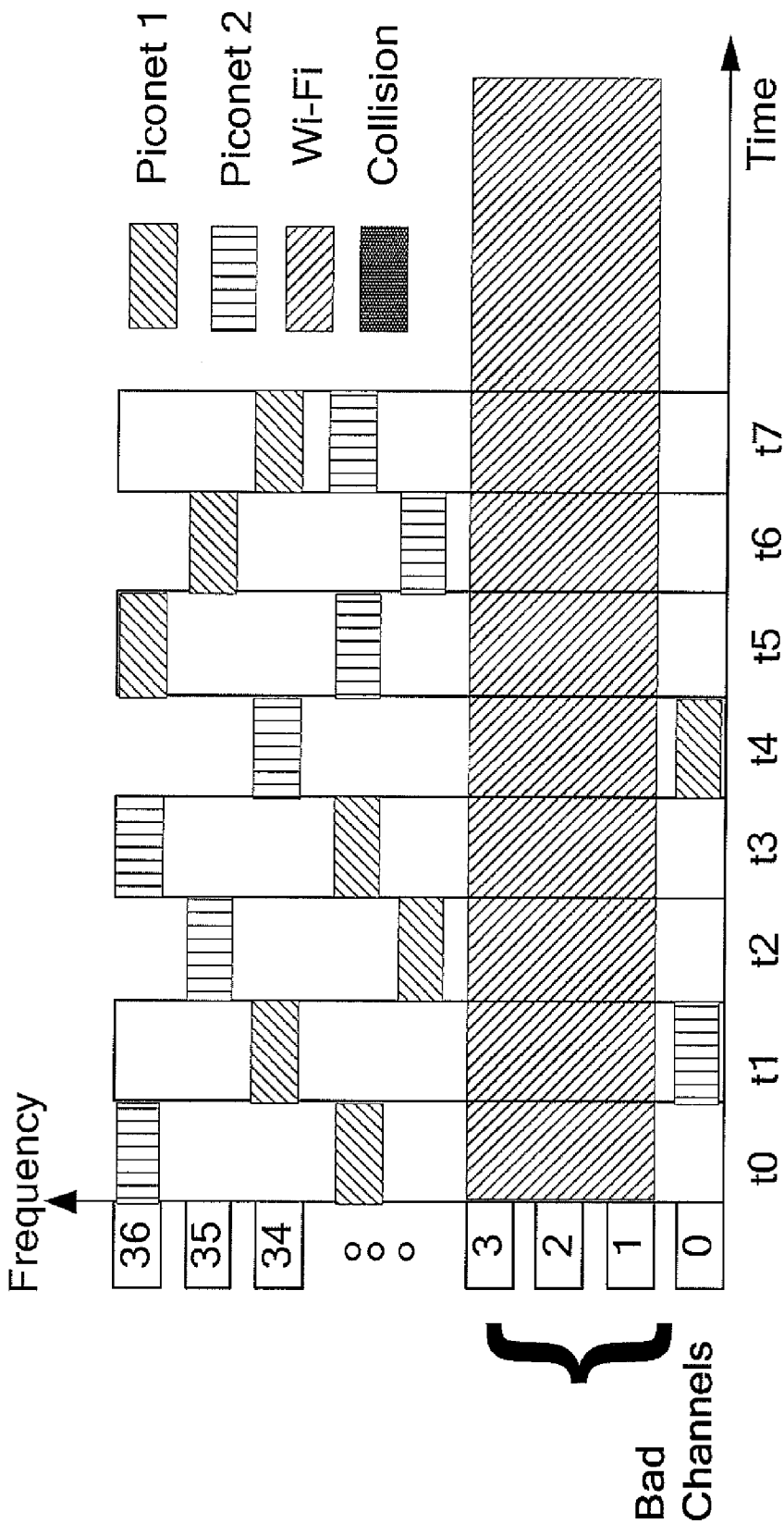
FIG. 13 shows a diagram illustrating a result of using an AFH scheme.

In FIG. 11, a block circuit diagram illustrating a configuration of a communication network control element, such as of BS 10, is shown, which is configured to implement the processing as described in connection with the first or second examples of embodiments of the invention, for example. It is to be noted that the communication network control device or BS 10 shown in FIG. 11 may comprise several further elements or functions besides those described herein below, which are omitted herein for the sake of simplicity as they are not essential for understanding the invention. Furthermore, even though reference is made to a BS, the communication network element may be also another device having a similar function, such as a modem chipset, a chip, a module etc., which can also be part of a BS or attached as a separate element to a BS, or the like.

The communication network control element or BS 10 may comprise a processing function or processor 11, such as a CPU or the like, which executes instructions given by programs or the like related to the power control. The processor 11 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 12 denote transceiver or input/output (I/O) unit connected to the processor 11. The I/O unit 12 may be used for communicating with the cellular network, such as a communication network element like a UE. The I/O unit 12 may be a combined unit comprising communication equipment towards several network elements, or may comprise a distributed structure with a plurality of different interfaces for different network elements. Reference sign 13 denotes a memory usable, for example, for storing data and programs to be executed by the processor 11 and/or as a working storage of the processor 11.

The processor 11 is configured to execute processing related to the above described mechanism for mitigating interference in the BTLE network. In particular, the processor 11 comprises a sub-portion 111 as a processing portion which is usable as a communication information receiving section which receives the communication information of the BTLE pico network to sent by a UE. The portion 111 may be configured to perform processing according to steps S10 and S110 according to FIGS. 3, 4, 7 and 8, for example. Furthermore, the processor 11 comprises a sub-portion 112 as a processing portion which is usable as a processing section for the collision mitigation data, which is able to conduct a processing according to a channel index information processing according to the first example of embodiments of the invention and/or a processing according to the sequence transform function processing according to the second example of embodiments of the invention. The portion 111 may be configured, for example, to perform processing according to steps S20 and S120 or steps S21 to 28 and/or steps S121 to S128 according to FIGS. 3, 4, 7 and 8, for example. Moreover, the processor 11 comprises a sub-portion 113 as a processing portion which is usable as a collision mitigation data preparation section for sending the collision mitigation data to the related UEs. Sub-portion 111 may also referred to as fulfilling a function of a receiver portion, and portion 113 may also referred to as transmitter portion.

As described above, examples of embodiments of the invention concerning the interference mitigation scheme are described to be implemented in UEs and BSs. However, the invention is not limited to this. For example, examples of embodiments of the invention may be implemented in any wireless modems or the like.

According to a further example of an embodiment of the present invention, there is provided an apparatus comprising a first transceiving means for communicating in a first network of a first communication technology type, a second transceiving means for communicating in a second network of a second communication technology type, a transmitting means for sending communication information regarding a communication in the first network to a communication network control element of the second network, wherein the communication information concern a frequency selection in the first network, a receiving means for receiving collision mitigation data regarding the communication in the first network from the communication network control element of the second network, wherein the collision mitigation data are usable for reducing an interference in the communication in the first network, a collision mitigation processing means for processing the collision mitigation data and to forward a result of the processing of the collision mitigation data to a network element of the first network.

In addition, according to a further example of an embodiment of the present invention, there is provided an apparatus comprising a transceiving means for communicating in a second network of a second communication technology type, a receiving means for receiving, from at least one communication network element, communication information regarding a communication of the at least one communication network element in a first network of a first communication technology type, wherein the communication information concern a frequency selection for a communication in the first network, a processing means for processing the received communication information for determining collision mitigation data for reducing an interference in the communication in the first network, and a transmitting means for sending the collision mitigation data regarding the communication in the first network to the at least one communication network element.

Moreover, according to a further example of an embodiment of the present invention, there is provided an apparatus comprising a transceiving means for communicating in a first network of a first communication technology type, a receiving means for receiving from a communication network element collision mitigation data regarding a communication in the first network, wherein the collision mitigation data are usable for reducing an interference in the communication in the first network, wherein the collision mitigation data comprises a sequence transform function usable for modifying an existing frequency hopping sequence used for a communication in the first network, and a processing means for using the received sequence transform function in a sequence transform block for modifying the frequency hopping sequence for selecting a new frequency channel for a communication in the first network.

For the purpose of the present invention as described herein above, it should be noted that an access technology via which signaling is transferred to and from a network element may be any technology by means of which a network element or sensor node can access another network element or node (e.g. via a base station or generally an access node). Any present or future technology, such as WLAN (Wireless Local Access Network), WiMAX (Worldwide Interoperability for Microwave Access), LTE, LTE-A, Bluetooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable communication networks and transmission nodes may be or comprise any device, apparatus, unit or means by which a station, entity or other user equipment may connect to and/or utilize services offered by the access network; such services include, among others, data and/or (audio-) visual communication, data download etc.;

a user equipment or communication network element may be any device, apparatus, unit or means by which a system user or subscriber may experience services from an access network, such as a mobile phone, personal digital assistant PDA, or computer, or a device having a corresponding functionality, such as a modem chipset, a chip, a module etc., which can also be part of a UE or attached as a separate element to a UE, or the like;

method steps likely to be implemented as software code portions and being run using a processor at a network element or terminal (as examples of devices, apparatuses and/or modules thereof, or as examples of entities including apparatuses and/or modules for it), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved; for example, for executing operations and functions according to examples of embodiments of the invention, one or more processors may be used or shared in the processing, or one or more processing sections or processing portions may be used and shared in the processing, wherein one physical processor or more than one physical processor may be used for implementing one or more processing portions dedicated to specific processing as described, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

As described above, there is provided an interference mitigation or frequency channel collision mitigation scheme usable for a short range communication network where a network element of a cellular network is used as a coordinator or controller for the collision mitigation. Communication information regarding a communication in the short range communication network and concerning a frequency selection for a communication are processed so as to determine collision mitigation data for reducing interference in the communication in the short range communication network. The collision mitigation data regarding the communication in the short range communication network are sent to a communication network element such as a UE acting as a master node of the short range communication network.

Although the present invention has been described herein before with reference to particular embodiments thereof, the present invention is not limited thereto and various modifications can be made thereto.

What is claimed is:

1. An apparatus comprising:
   circuitry configured to
   communicate in a second network of a second communication technology type,
   receive, from at least one communication network element, communication information regarding a communication of the at least one communication network element in a first network of a first communication technology type different from the second technology type, the communication information being for frequency selection for communication in the first network,
   process the received communication information to determine collision mitigation data comprising a sequence transform function which is applied to a frequency hopping sequence of the first network for reducing an interference in the communication in the first network, and
   forward the sequence transform function as the collision mitigation data to the at least one communication network element, whose communication in the first network is determined to be interfered.

2. The apparatus according to claim 1, wherein the circuitry is further configured to:
   predict one or more improper frequency channels for communication in the first network based on the received communication information, the improper frequency channel being a frequency channel where an interference in a communication in the first network occurs,
   determine a channel index information element based on the result of the improper frequency channel prediction processing, the channel index information element indicating at least one frequency channel that is improper for a communication in the first network, and
   forward the channel index information element as the collision mitigation data to the at least one communication network element whose communication in the first network is determined to be interfered.

3. The apparatus according to claim 2, wherein the circuitry is further configured to
   determine whether a number of first networks in a specific area exceeds a predetermined number, and if the determination is positive,
   calculate frequency hopping sequences for each of the first networks determined in the specific area based on communication information received, and
   obtain a collision probability for communications in each of the first networks determined in the specific area and for each frequency channel by determining a frequency hopping map of each of the first networks determined in the specific area, compare the determined frequency hopping maps with each other to achieve a collision probability of frequency channels.

4. The apparatus according to claim 3, wherein the circuitry is further configured to determine whether the collision probability of frequency channels is higher than a preset threshold, and if the determination is positive, find a frequency channel having a highest collision probability, assign the found frequency channel as an improper frequency channel for the related first networks, and repeat the processing for calculating the frequency hopping sequences for each of the first networks determined in the specific area, obtaining a collision probability for communications in each of the first networks determined in the specific area and for each frequency channel, without the found channel, and determining whether the collision probability of the frequency channels is higher than the preset threshold.

5. The apparatus according to claim 1, wherein the circuitry is further configured to determine whether a number of first networks in a specific area exceeds a predetermined number, and if the determination is positive, calculate frequency hopping sequences for each of the first networks determined in the specific area based on communication information received, and obtain a collision probability for communications in each of the first networks determined in the specific area by determining a frequency hopping map of each of the first networks determined in the specific area, compare the determined frequency hopping maps with each other, and achieve a collision probability of frequency channels on the basis of the comparison.

6. The apparatus according to claim 5, wherein the circuitry is further configured to determine whether the collision probability of first networks determined in the specific area is higher than a preset threshold, and if the determination is positive, select one or more of the first networks determined in the specific area having a highest collision probability, apply at least one type of sequence transform function to the frequency hopping sequences of the selected first networks, and detect a degree of interference reduction caused by a modification of the frequency hopping sequences of the selected first networks with the applied sequence transform function.

7. The apparatus according to claim 6, wherein the circuitry is further configured, if the degree of interference reduction satisfies a preset minimum reduction, forward the applied sequence transform function as the collision mitigation data, or if the degree of interference reduction does not satisfy the preset minimum reduction, apply another type of sequence transform function to the frequency hopping sequences of the selected first networks, and detect a new degree of interference reduction caused by the modification of the frequency hopping sequences of the selected first networks with the other applied sequence transform function.

8. The apparatus according to claim 1, wherein the first network includes at least one pico network based and the second network includes a cellular communication network, wherein the apparatus is comprised in a communication network control element of the second network, the communication network element is operating as a gateway element between the first network and the second network, and the network element of the first network is a slave node.

9. The apparatus according to claim 8, wherein the communication network control element of the second network is a base station.

10. The apparatus according to claim 8, wherein the pico network uses a predetermined short-range communication protocol.

11. A method comprising:

communicating, with circuitry, in a second network of a second communication technology type;

receiving, with the circuitry and from at least one communication network element, communication information regarding a communication of the at least one communication network element in a first network of a first communication technology type different from the second technology type, the communication information being for frequency selection for communication in the first network;

processing, with the circuitry, the received communication information to determine collision mitigation data comprising a sequence transform function which is applied to a frequency hopping sequence of the first network for reducing an interference in the communication in the first network; and forwarding, with the circuitry, the sequence transform function as the collision mitigation data to the at least one communication network element, whose communication in the first network is determined to be interfered.

12. The method according to claim 11, further comprising:

predicting, with the circuitry, one or more improper frequency channels for communication in the first network based on the received communication information, the improper frequency channel being a frequency channel where an interference in a communication in the first network occurs;

determining, with the circuitry, a channel index information element based on the result of the improper frequency channel prediction processing, the channel index information element indicating at least one frequency channel that is improper for a communication in the first network; and forwarding, with the circuitry, the channel index information element as the collision mitigation data to the at least one communication network element whose communication in the first network is determined to be interfered.

13. The method according to claim 12, further comprising:

determining, with the circuitry, whether a number of first networks in a specific area exceeds a predetermined number, and if the determination is positive, calculating, with the circuitry frequency hopping sequences for each of the first networks determined in the specific area based on communication information received; and obtaining, with the circuitry, a collision probability for communications in each of the first networks determined in the specific area and for each frequency channel by determining a frequency hopping map of each of the first networks determined in the specific area, comparing the determined frequency hopping maps with each other to achieve a collision probability of frequency channels.

14. The method according to claim 13, further comprising:

determining, with the circuitry, whether the collision probability of frequency channels is higher than a preset threshold, and if the determination is positive, finding, with the circuitry, a frequency channel having a highest collision probability;

assigning, with the circuitry, the found frequency channel as an improper frequency channel for the related first networks; and repeating the processing for calculating the frequency hopping sequences for each of the first networks determined in the specific area, obtaining a collision probability for communications in each of the first networks determined in the specific area and for each frequency channel, without the found channel, and determining whether the collision probability of the frequency channels is higher than the preset threshold.

15. The method according to claim 11, further comprising determining, with the circuitry, whether a number of first networks in a specific area exceeds a predetermined number, and if the determination is positive;

calculating, with the circuitry, frequency hopping sequences for each of the first networks determined in the specific area based on communication information received; and obtaining, with the circuitry, a collision probability for communications in each of the first networks determined in the specific area by determining a frequency hopping map of each of the first networks determined in the specific area, comparing the determined frequency hopping maps with each other, and achieving a collision probability of frequency channels on the basis of the comparison.

16. The method according to claim 15, further comprising:

determining, with the circuitry, whether the collision probability of first networks determined in the specific area is higher than a preset threshold, and if the determination is positive;

selecting, with the circuitry, one or more of the first networks determined in the specific area having a highest collision probability;

applying, with the circuitry, at least one type of sequence transform function to the frequency hopping sequences of the selected first networks, and detecting, with the circuitry, a degree of interference reduction caused by a modification of the frequency hopping sequences of the selected first networks with the applied sequence transform function.

17. The method according to claim 16, further comprising:

if the degree of interference reduction satisfies a preset minimum reduction, forwarding, with the circuitry, the applied sequence transform function as the collision mitigation data; or if the degree of interference reduction does not satisfy the preset minimum reduction, applying, with the circuitry, another type of sequence transform function to the frequency hopping sequences of the selected first networks, and detecting a new degree of interference reduction caused by the modification of the frequency hopping sequences of the selected first networks with the other applied sequence transform function.

18. The apparatus according to claim 11, wherein the first network includes at least one pico network based and the second network includes a cellular communication network, and the method is performed by a communication network control element of the second network, the communication network element is operating as a gateway element between the first network and the second network, and the network element of the first network is a slave node.

* * * * *